United States Patent [19]

Miyahara et al.

[11] Patent Number: 5,255,396
[45] Date of Patent: Oct. 26, 1993

[54] SANITARY CLEANING DEVICE INCLUDING A ROTATION DECELERATION DEVICE

[75] Inventors: Shinjiro Miyahara, Yamatokoriyama; Kazuaki Fujita, Nara, both of Japan

[73] Assignee: Matsushita Electric Industrial Co., Ltd., Osaka, Japan

[21] Appl. No.: 918,367

[22] Filed: Jul. 23, 1992

[30] Foreign Application Priority Data

Jul. 26, 1991 [JP] Japan ................. 3-187358
Jul. 29, 1991 [JP] Japan ................. 3-188627
Aug. 22, 1991 [JP] Japan ................. 3-210652

[51] Int. Cl.⁵ ............................................ A47K 13/10
[52] U.S. Cl. .......................................... 4/246.2; 4/248
[58] Field of Search ............... 4/236, 240, 241, 246.1, 4/246.2, 248, 420.4, 447

[56] References Cited

U.S. PATENT DOCUMENTS

| | | | |
|---|---|---|---|
| 5,010,601 | 4/1991 | Kobayashi et al. | 4/236 |
| 5,142,740 | 9/1992 | Amaki et al. | 4/236 X |
| 5,193,228 | 3/1993 | Murasawa et al. | 4/236 |

FOREIGN PATENT DOCUMENTS

| | | |
|---|---|---|
| 0393005 | 7/1991 | Austria . |
| 0326084 | 8/1989 | European Pat. Off. . |
| 3437138 | 4/1986 | Fed. Rep. of Germany . |
| 3722114 | 1/1988 | Fed. Rep. of Germany . |
| 3718705 | 12/1988 | Fed. Rep. of Germany . |
| 2503304 | 10/1982 | France . |
| 5850342 | 3/1983 | Japan . |

OTHER PUBLICATIONS

"Expandable Rotor Compensates for Viscosity", Machine Design, No. 37, Apr. 15, 1965, Penton Inc. Cleveland, p. 162.

Primary Examiner—Henry J. Recla
Assistant Examiner—Robert M. Fetsuga
Attorney, Agent, or Firm—Renner, Otto, Boisselle & Sklar

[57] ABSTRACT

A rotation deceleration device used for a sanitary cleaning device which includes a toilet seat and a toilet cover and is attached to a toilet bowl, thereby injecting warm water in the toilet bowl. The rotation deceleration device includes a cylinder having a hydraulic chamber filled with a control oil; a rotation shaft inserted through the cylinder; a control wall radially projected from the rotation shaft to divide the hydraulic chamber into at least two sub chambers; a control valve provided between the control wall and an inner surface of the cylinder. The control valve has a closing wall opposed to a side surface of the control wall so as to be attachable thereto and also has an engaging member opposed to the other side of the control wall so as to be engageable therewith in accordance with the rotation of the rotation shaft. The control valve is formed of a material which has a higher coefficient of thermal expansion than that of a material forming the control wall and the cylinder.

3 Claims, 3 Drawing Sheets

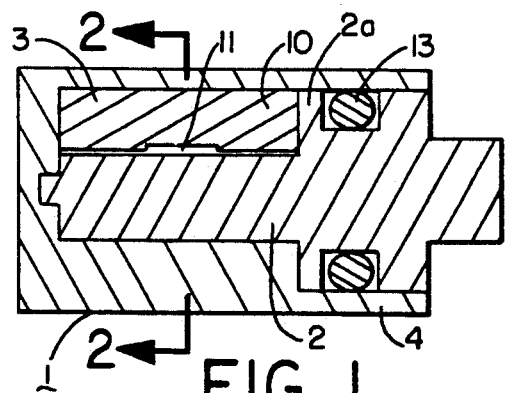
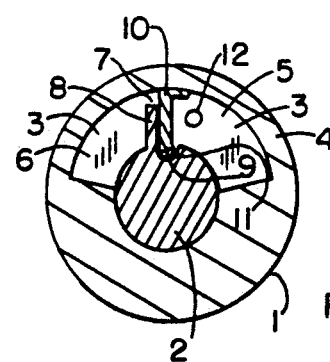
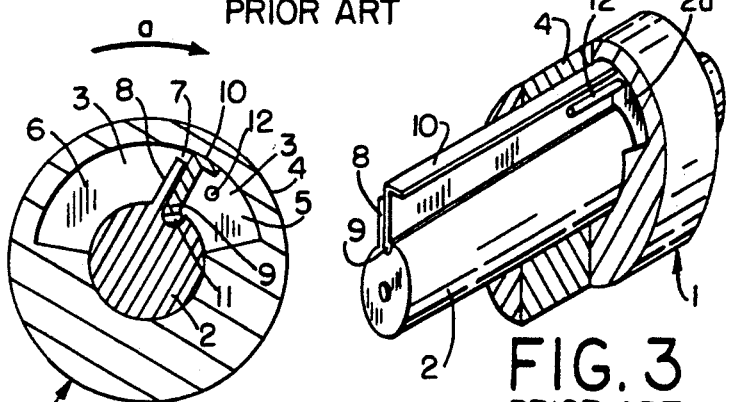
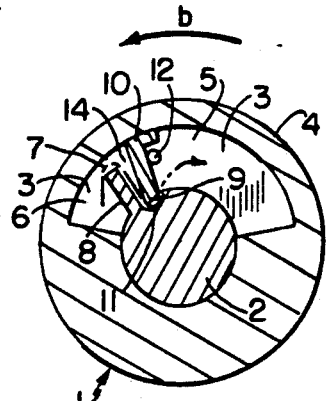
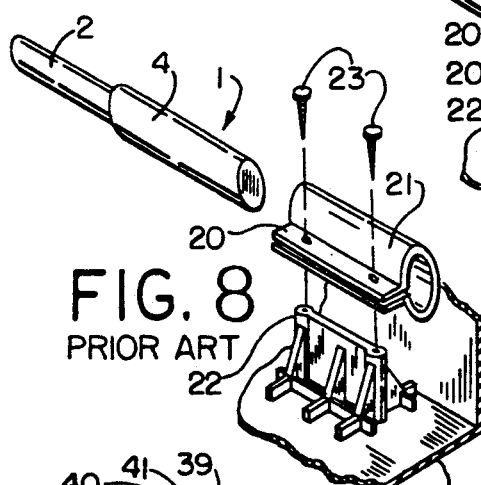
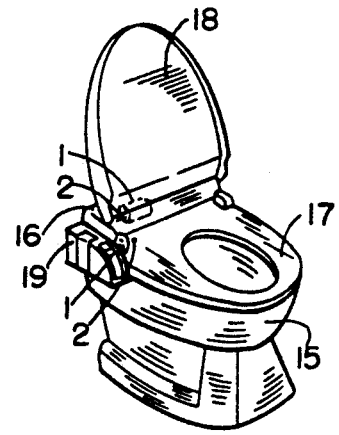
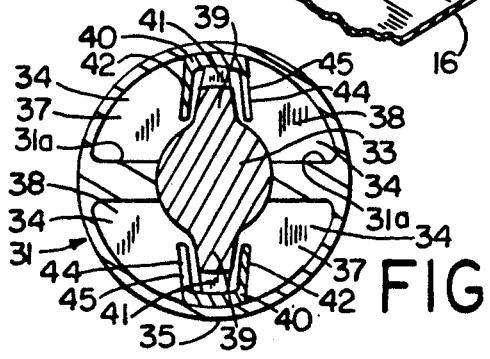
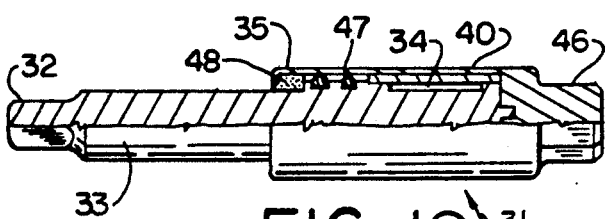

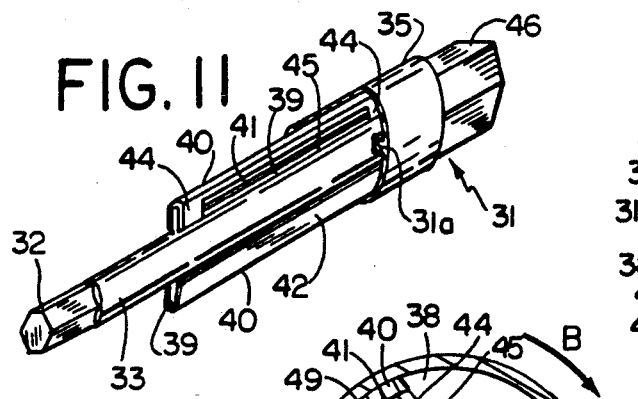
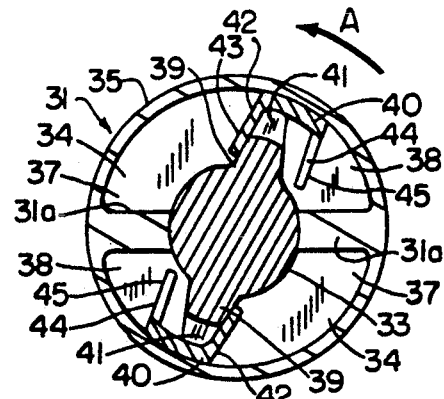
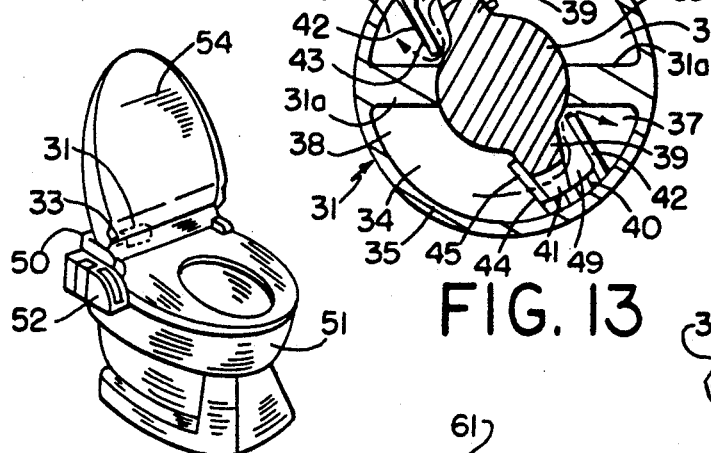
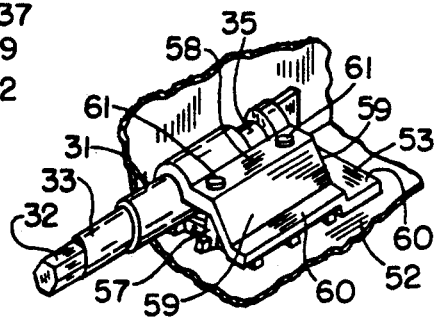
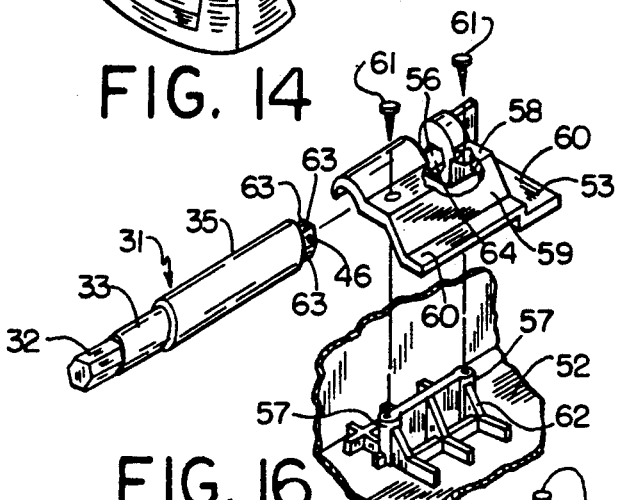
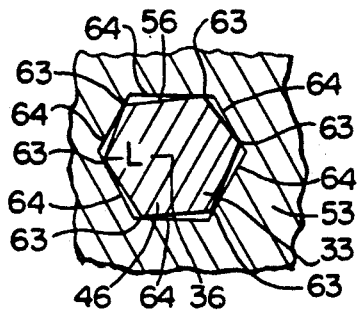
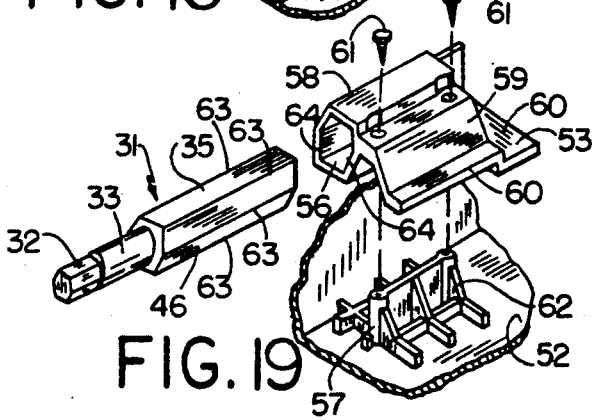
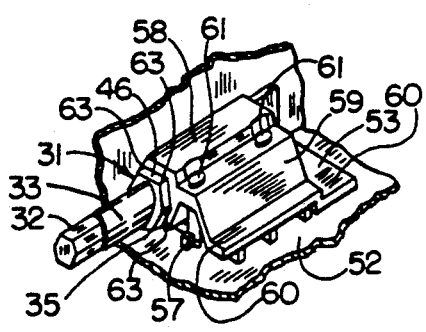

SANITARY CLEANING DEVICE INCLUDING A ROTATION DECELERATION DEVICE

BACKGROUND OF THE INVENTION

1. Field of the Invention

The present invention relates to a sanitary cleaning device which includes a toilet seat and a toilet cover and is attached to a toilet bowl, thereby injecting warm water in the toilet bowl. In particular, the present invention relates to a cleaning main body mounted on the toilet bowl and also to a rotation deceleration device used for connecting the cleaning main body and the toilet seat or the toilet cover.

2. Description of the Prior Art

A sanitary cleaning device mounted on a toilet bowl includes a cleaning main body for injecting warm water in the toilet bowl, a toilet seat, and a toilet cover. The cleaning main body is mounted on the toilet bowl and is connected to the toilet seat and the toilet cover each through a rotation deceleration device. In the rotation deceleration device, a deceleration mechanism is controlled not to function when the toilet seat or the toilet cover is being opened and is controlled to function when the toilet seat or the toilet cover is being closed.

A conventional rotation deceleration device 1 will be described with reference to FIGS. 1 through 5.

As is shown in FIGS. 1 and 2, the conventional rotation deceleration device 1 includes a cylinder 4 containing a hydraulic chamber 3 which has a substantially semicircular cross section and is filled with a control oil, and a rotation shaft 2 inserted through the cylinder 4. An end portion of the rotation shaft 2 is extended from the cylinder 4. The rotation shaft 2 has a control wall 8 radially projected therefrom so as to divide the hydraulic chamber 3 into a pressurizing chamber 5 and a pressure reducing chamber 6 in a rotation direction thereof. The pressurizing chamber 5 and the pressure reducing chamber 6 are connected to each other through a passage 7 made between an inner surface of the cylinder 4 and the control wall 8. A control valve 10 is provided in the pressurizing chamber 5 so as to be opposed to a side surface of the control wall 8. The control valve 10 is rotated integrally with the rotation shaft 2 in the cylinder 4 by the rotation of the rotation shaft 2 toward the pressurizing chamber 5. An inner portion, of the control valve 10, extended along an axial direction of the rotation shaft 2 functions as a rotation center 9 thereof, the end being disposed in the vicinity of a peripheral portion of the rotation shaft 2. An outer portion of the control valve 10 is slid on the inner surface of the cylinder 4. A control outlet 11 is made in the vicinity of the rotation center 9 of the control valve 10, through which the control oil flows from the pressurizing chamber 5 to the pressure reducing chamber 6. As is shown in FIG. 3, a flange portion 2a of the rotation shaft 2 is engaged in an end portion of the cylinder 4 from which the rotation shaft 2 is extended, and a stopping rod 12 is projected from the flange portion 2a of the rotation shaft 2 toward the pressurizing chamber 5 for stopping the rotation of the control valve 10. O-rings 13 (FIG. 1) for preventing the control oil from flowing out of the hydraulic chamber 3 are provided in the flange portion 2a of the rotation shaft 2. The rotation shaft 2, the cylinder 4, and the control valve 10 are formed of an identical material in order to restrict wearing of the sliding surfaces of the control valve 10 and the cylinder 4 and the contact portions of the control valve 10 and the rotation shaft 2.

The rotation deceleration device 1 having the above construction is operated in the following manner.

When the rotation shaft 2 is rotated in the direction of an arrow a of FIG. 4, the control valve 10 is rotated in the state of being pressed on the control wall 8. Accordingly, the control oil in the pressurizing chamber 5 is compressed to raise the inner pressure of the chamber 5, thereby decelerating the rotation of the rotation shaft 2.

When the rotation shaft 2 is rotated in the direction of an arrow b of FIG. 5, a passage way 14 is made between the control valve 10 and the control wall 8. Accordingly, the pressurizing chamber 5 and the pressure reducing chamber 6 are connected to each other through the control outlet 11, the passage way 14, and the passage 7. Since the control oil flows as is shown by the chain line of FIG. 5, the decelerating effect on the rotation of the rotation shaft 2 is almost completely lost except for the viscosity resistance of the control oil.

The rotation deceleration device 1 has the following problem. When the ambient temperature is high as in summer, the control oil easily flows due to a low viscosity thereof. Further, since the control wall 8, the cylinder 4, and the control valve 10 are formed of an identical material, these members have a substantially identical deformation ratio in accordance with the ambient temperature. For these reasons, the sizes of a gap between the control valve 10 and the cylinder 4 and a gap between the control valve 10 and the control wall 8 are not changed. Therefore, the control oil more easily flows from the pressurizing chamber 5 to the pressure reducing chamber 6, thereby lowering the inner pressure of the pressurizing chamber 5 to reduce the decelerating effect.

A conventional sanitary cleaning device 19 including the rotation deceleration device 1 will be described with reference to FIGS. 6 through 8.

As is shown in FIG. 6, the conventional sanitary cleaning device 19 mounted on a toilet bowl 15 includes a cleaning main body 16, two rotation deceleration devices 1 mounted on the cleaning main body 16 each through a fixing member 21, a toilet seat 17 and a toilet cover 18. The toilet seat 17 and the toilet cover 18 are rotatably connected to the cleaning main body 16 each through the rotation shaft 2. As is shown in FIGS. 7 and 8, the fixing member 21 is formed of a metal plate folded to have a substantially U-shaped cross section and to have two end portions 20 opposed to each other. The cylinder 4 of the rotation deceleration device 1 is inserted into the fixing member 21, and the end portions 20 are firmly fixed to a mounting section 22 projected from the cleaning main body 16 through pins 23, thereby directly fixing the rotation deceleration device 1 to the cleaning main body 16.

The toilet seat 17 and the toilet cover 18 are opened when being manually operated. At this point, the toilet seat 17 and the toilet cover 18 are smoothly rotated while the rotation thereof is not decelerated by the rotation deceleration device 1. When being lightly pulled from a vertical position to a slightly slanting position, the toilet seat 17 and the toilet cover 18 are closed by the weight thereof while rapid rotation thereof is restricted by the decelerating effect of the rotation deceleration device 1.

In the above construction, the rotation deceleration device 1 is supported by the fixing member 21 which is cantilevered by the mounting section 22 projected upward from the cleaning main body 16. Accordingly, a stress generated by a total rotation moment obtained when the toilet seat 17 or the toilet cover 18 is opened or closed is applied to the mounting section 22 of the cleaning main body 16 through the fixing member 21. In other words, the stress is concentrated on the mounting section 22, thereby significantly damaging the mounting section 22.

SUMMARY OF THE INVENTION

The rotation deceleration device according to the present invention includes a cylinder having a hydraulic chamber filled with a control oil; a rotation shaft inserted through the cylinder; a control wall radially projected from the rotation shaft to divide the hydraulic chamber into at least two sub chambers; a control valve provided between the control wall and an inner surface of the cylinder. The control valve has a closing wall opposed to a side surface of the control wall so as to be attachable thereto and also has an engaging member opposed to the other side of the control wall so as to be engageable therewith in accordance with the rotation of the rotation shaft. The control valve is formed of a material which has a higher coefficient of thermal expansion than that of a material forming the control wall and the cylinder.

In another aspect of the present invention, the sanitary cleaning device includes a cleaning main body attached to a toilet bowl for injecting warm water in a toilet bowl, the cleaning main body including a mounting section which has a slanting portion and is projected upward; a fixing member fixed to the mounting section of the cleaning main body; a rotation deceleration device including a cylinder fixed to the fixing member and a rotation shaft inserted through the cylinder; and a toilet cover attached to the rotation shaft. The rotation of the rotation shaft is restricted in one direction. The fixing member includes a top portion fixed to the mounting section of the cleaning main body, a side portion integrally formed with the top portion so as to be pressed on the slanting portion of the mounting section, and a bottom portion formed by folding a lower end of the side portion so as to be pressed on a surface of the mounting section from which the mounting section is projected upward.

Alternatively, the sanitary cleaning device includes a cleaning main body attached to a toilet bowl for injecting warm water in a toilet bowl, the cleaning main body including a mounting section projected upward; a fixing member fixed to the mounting section of the cleaning main body; a rotation deceleration device including a cylinder fixed to the fixing member and a rotation shaft inserted through the cylinder; and a toilet seat attached to the rotation shaft. The rotation of the rotation shaft is restricted in one direction. The fixing member is formed of a plate in which an end thereof is fixed to the mounting section of the cleaning main body and the other end is a free end to which the cylinder of the rotation deceleration device is fixed.

Thus, the invention described herein makes possible the advantages of (1) providing a rotation deceleration device which is hardly influenced by the ambient temperature in terms of performance; and (2) providing a sanitary cleaning device having a mechanism for mounting the rotation deceleration device without applying too much stress on a mounting section of the sanitary cleaning device.

These and other advantages of the present invention will become apparent to those skilled in the art upon reading and understanding the following detailed description with reference to the accompanying figures.

BRIEF DESCRIPTION OF THE DRAWINGS

FIG. 1 is a cross sectional view of a conventional rotation deceleration device.

FIG. 2 is another cross sectional view of the conventional rotation deceleration device taken along the line II—II of FIG. 1.

FIG. 3 is a partially cut perspective view of an essential part of the conventional rotation deceleration device.

FIGS. 4 and 5 are views illustrating the operation of the conventional rotation deceleration device.

FIG. 6 is a perspective view of a conventional sanitary cleaning device.

FIG. 7 is a perspective view of a fixing member of the conventional sanitary cleaning device.

FIG. 8 is an exploded view of the fixing member of FIG. 7.

FIG. 9 is a cross sectional view of an essential part of a rotation deceleration device according to an example of the present invention.

FIG. 10 is a partial cross sectional view of the rotation deceleration device of FIG. 9.

FIG. 11 is a perspective view of an essential part of the rotation deceleration device of FIG. 9.

FIGS. 12 and 13 are views illustrating the operation of the rotation deceleration device of FIG. 9.

FIG. 14 is a perspective view of a sanitary cleaning device according to an example of the present invention.

FIG. 15 is a perspective view of a fixing member of the sanitary cleaning device of FIG. 14.

FIG. 16 is an exploded view of the fixing member of FIG. 15.

FIG. 17 is a view illustrating a dynamic function of mounting the rotation deceleration device of FIG. 9 on the sanitary cleaning device of FIG. 14.

FIG. 18 is a perspective view of a modified fixing member of the sanitary cleaning device of FIG. 14.

FIG. 19 is an exploded view of the fixing member of FIG. 18.

DESCRIPTION OF THE PREFERRED EMBODIMENTS

Figure 20:
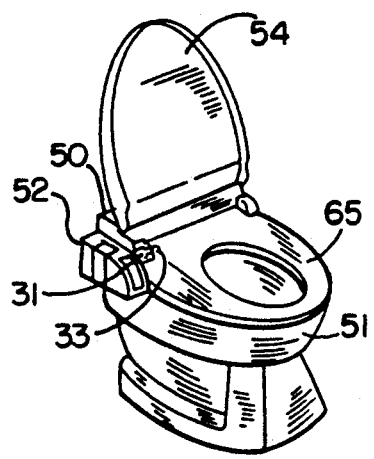
FIG. 20 is a perspective view of a different sanitary cleaning device according to another example of the present invention.

Hereinafter, the present invention will be described by way of illustrating examples with reference to the accompanying drawings.

A rotation deceleration device 31 according to an example of the present invention will be described with reference to FIGS. 9 through 13.

As is shown in FIGS. 10 and 11, the rotation deceleration device 31 includes a cylinder 35 having two hydraulic chambers 34 each filled with a control oil and a rotation shaft 33 inserted through the cylinder 35. The rotation shaft 33 has an end portion thereof disposed in the cylinder 35 and another end portion thereof extended from the cylinder 35. A tip of the extended end portion includes a connection member 32 for connecting the rotation deceleration device 31 and a sanitary cleaning device (not shown). An end portion of the cylinder 35 opposite to the end from which the rotation shaft 33 is extended has a connection boss 46 having, for example, a hexagonal cross section. As is shown in FIGS. 9 and 11, the cylinder 35 includes a pair of partitioning walls 31a supporting the rotation shaft 33 so that the rotation shaft 33 is coaxially rotatable with the cylinder 35. The partitioning walls 31a are arranged symmetrically with a rotation center 36 of the rotation shaft 33 therebetween. The hydraulic chambers 34 are partitioned by the partitioning walls 31a. The rotation shaft 33 also has two control walls 39 radially projected therefrom, each so as to divide the corresponding hydraulic chamber 34 into a pressurizing chamber 37 and a pressure reducing chamber 38 in a rotation direction of the rotation shaft 33. The control walls 39 are arranged symmetrically with the rotation center 36 of the rotation shaft 33 therebetween. Since both symmetrical sections of the rotation deceleration device 31 are identical with each other, only one side will be described for simplicity.

A control valve 40 is provided between the control wall 39 and an inner surface of the cylinder 35 in such a manner that an outer surface of the control valve 40 is in contact with the inner surface of the cylinder 35. A passage 41 is made between the control valve 40 and an end of the control wall 39, the passage 41 connecting the pressurizing chamber 37 and the pressure reducing chamber 38. The control valve 40 includes a closing wall 42 disposed in the pressurizing chamber 37. The closing wall 42 is opposed to a side surface of the control wall 39 and attachable thereto. The control valve 40 further includes engaging members 44 at both ends of the control valve 40 in an axial direction of the cylinder 35. The engaging members 44 are disposed in the pressure reducing chamber 38 and engageable with the control wall 39 in accordance with the rotation of the rotation shaft 33. The control valve 40 has a cutout 45 between the engaging members 44 through which the pressure reducing chamber 38 and the passage 41 are connected to each other. The control wall 39 and the closing wall 42 of the control valve 40 have a narrow gap therebetween, and the control wall 39 and each engaging member 44 has a narrow gap therebetween, both as play in the rotation direction thereof.

The cylinder 35 and the control wall 39 are formed of a metal such as zinc diecast, and the control valve 40 is formed of a resin such as polyacetal which has a larger coefficient of thermal expansion than that of the metal such as zinc diecast.

As is shown in FIG. 10, O-rings 47 for sealing the gap between the cylinder 35 and the rotation shaft 33 are provided at the end portion of the cylinder 35 from which the rotation shaft 33 is extended. One of the O-rings 47 closer to the end of the cylinder 35 from which the rotation shaft 33 is extended has a cup 48 for sealing an opening of the cylinder 35 and for rotatably supporting the rotating shaft 33.

The rotation deceleration device 31 having the above construction is operated in the following manner.

When the rotation shaft 33 is rotated in the direction of an arrow A of FIG. 12, the control wall 39 is rotated in the state of being pressed on the closing wall 42 of the control valve 40 disposed in the pressurizing chamber 37. Accordingly, the control oil in the pressurizing chamber 37 is compressed to raise the inner pressure of the pressurizing chamber 37, thereby decelerating the rotation of the rotation shaft 33. At this point, the raised inner pressure of the pressurizing chamber 37 acts on the sliding surfaces of the control valve 40 and the cylinder 35, thereby pressing the control valve 40 away from the control wall 39 to generate a narrow gap between the control valve 40 and the control wall 39. The control oil is leaked through the gap from the pressurizing chamber 37 to the pressure reducing chamber 38 while the rotation shaft 33 is rotated.

When the rotation shaft 33 is rotated in the direction of an arrow B of FIG. 13, the control wall 39 is rotated in the state of being pressed on the engaging members 44. Accordingly, a passage way 49 is made between the control wall 39 and the closing wall 42, and the pressurizing chamber 37 and the pressure reducing chamber 38 are connected to each other through the passage 41, the passage way 49, and the cutout 45 between the engaging members 44. Since the control oil flows as is shown by the chain line of FIG. 13, the decelerating effect on the rotation of the rotation shaft 33 is almost completely lost except for the viscosity resistance of the control oil. Moreover, the control wall 39 and the control valve 40 are engaged with each other with a gap corresponding to the passage 41 therebetween in the rotation direction thereof. Therefore, in the case when the rotation shaft 33 is rotated in the direction of the arrow B (FIG. 13) without decelerating the rotation and then is rotated in the direction of the arrow A (FIG. 12), the rotation shaft 33 can be rotated without decelerating the rotation by the size of the gap. Accordingly, when a toilet seat or a toilet cover is once opened and then is closed, generation of a braking force is prevented until the toilet seat is closed to an angle at which the closing operation is possible due to the weight of the toilet seat.

Further, the control wall 39 and the cylinder 35 are formed of, for example, zinc diecast, and the control valve 40 is formed of, for example, polyacetal. Owing to the difference in the material, the change of the decelerating effect in accordance with the ambient temperature can significantly be restricted. When the ambient temperature is high as in summer, the control oil easily flows due to a low viscosity thereof. On the other hand, polyacetal has a larger coefficient of thermal expansion than that of zinc diecast, which means the control valve 40 is deformed by a higher ratio than the cylinder 35 and the control wall 39. As a result, a gap between the inner surface of the cylinder 35 and the control valve 40 and a gap between the control wall 39 and the control valve 40 are narrowed. Thus, the amount of the control oil is adjusted so as to restrict the reduction of the inner pressure of the pressurizing chamber 37. When the ambient temperature is low as in winter, the influence of the enlarged size of the above gaps on the inner pressure is practically negligible owing to a high viscosity of the control oil. Additionally, an oil film is constantly generated between the control valve 40 and the cylinder 35, which prevents the decline of performance due to wearing.

A sanitary cleaning device 50 according to an example of the present invention will be described with reference to FIGS. 14 through 17. In this example, the rotation deceleration device 31 is mounted on a toilet cover 54.

As is shown in FIG. 14, a sanitary cleaning device 50 mounted on a toilet bowl 51 includes a cleaning main body 52 provided on the toilet bowl 51, the rotation deceleration device 31 mounted on the cleaning main body 52 through a fixing member 53 (FIG. 15), and the toilet cover 54 rotatably connected to the cleaning main body 52 through the rotation shaft 33. As is shown in FIG. 16, the cylinder 35 is connected to the connecting boss 46 having a hexagonal cross section. As is shown in FIG. 17, in the cross section of the hexagonal connecting boss 46, one side is longer than the other sides, and the distances L between the rotation center 36 and all the edge lines 63 are almost identical with one another. Accordingly, the cross section of the connection boss 46 is inscribed in a circle having a radius (L), for example, an outer peripheral circle of the cylinder 35.

As is shown in FIG. 16, the fixing member 53 includes top portions 58, a side portion 59, and bottom portions 60 which are integrally formed in such a shape as matches a mounting section 57 projected from the cleaning main body 52. The top portions 58 are fixed to the mounting section 57 through pins 61, an inner surface of the side portion 59 is pressed on a slanting portion 62 of the mounting section 57, and the bottom portions 60 are pressed on an inner surface of the cleaning main body 52. Thus, as is shown in FIG. 15, the fixing member 53 is mounted on the cleaning main body 52.

The fixing member 53 has a recess portion 56 for receiving the connection boss 46. The recess portion 56 is formed in connection with the top portions 58. As is shown in FIG. 17, the recess portion 56 has a shape proportional to that of the connection boss 46. By inserting the connection boss 46 into the recess portion 56, the rotation deceleration device 31 and the fixing member 53 are connected to each other.

As mentioned before, the connection member 32 having a polygonal cross section is provided at the tip of the rotation shaft 33. The distances L between the rotation center 36 and all the edge lines of the connection member 32 are almost identical with one another. Accordingly, the cross section of the connection member 32 is inscribed in a circle having a radius (L), for example, an outer peripheral circle of the rotation shaft 33. By inserting the connection member 32 into the toilet cover 54, the rotation deceleration device 31 and the toilet cover 54 are connected to each other.

In the above construction, the toilet cover 54 is opened when being manually operated. When being lightly pulled from a vertical position to a slightly slanting position, the toilet cover 54 is closed by the weight of the toilet cover 54 itself while rapid rotation thereof is restricted by the decelerating effect of the rotation deceleration device 31. A stress generated by the rotation moment and the like which are generated when the toilet cover 54 is opened or closed is applied to the cleaning main body 52 through the rotation deceleration device 31. The stress is distributed to the whole part of the cleaning main body 52 by the function of the fixing member 53. In more detail, a portion of the stress transferred to the fixing member 53 through the rotation deceleration device 31 is further transferred to the mounting section 57. Since the bottom portions 60 are pressed on the inner surface of the cleaning main body 52 and the side portion 59 is pressed on the slanting portion 62 of the mounting section 57, the stress applied to the mounting section 57 is directly transferred to the cleaning main body 52 through the fixing member 53, thereby reducing the stress applied to a tip of the mounting section 57.

A stress generated by the rotation moment and the like which are generated when the toilet cover 54 is opened or closed is also applied to the recess portion 56 of the fixing member 53 through the connection boss 46. The stress is distributed to the whole part of the recess portion 56 by the effect of the polygonal shape of the connection boss 46 and the recess portion 56. The connection boss 46 having the hexagonal cross section and the recess portion 56 having the cross section proportional to that of the connection boss 46 are dynamically connected to each other in the state where the edge lines 63 of the connection boss 46 are in contact with an inner surface 64 of the recess portion 56. Since the distances L between the rotation center 36 and all the edge lines 63 of the cross section of the connection boss 46 are substantially identical with one another, the connection boss 46 has a substantially identical rotation moment to all the edge lines 63. Accordingly, the stress transferred to the recess portion 56 through the connection boss 46 is substantially uniformly distributed on the inner surface 64 of the recess portion 56 and also on the hexagonal end surface of the connection boss 46.

In this example, the cross section of the connection boss 46 has a hexagonal shape in which the distances L between the rotation center 36 and the edge lines 63 are substantially identical with one another and is inscribed in, for example, the cylinder 35. The above cross section may have a hexagonal shape in which the distances between the rotation center 36 and all the sides are substantially identical with one another and is circumscribed to, for example, the cylinder 35. The same effects can be obtained.

Since one side is different in length from the other sides in the cross section of the connection boss 46, the connection direction of the rotation deceleration device 31 and the fixing member 53 is determined, whereby a desirable mounting angle can accurately be realized.

As is shown in FIGS. 18 and 19, the cylinder 35 may be formed to have a hexagonal cross section in which the distances between the rotation center 36 and the edge lines 63 are substantially identical with one another, so that the cylinder 35 can be inscribed in a circle to function as the connection boss 46. In this case also, the fixing member 53 has the recess portion 56 having a proportional shape to the cross section of the cylinder 35, and the rotation deceleration device 31 and the fixing member 53 are connected to each other by inserting the connection boss 46 into the recess portion 56. In such a construction, the connection boss 46 and the recess portion 56 can be larger, thereby more effectively preventing the stress from concentrating on the fixing member 53. As a result, the fixing member 53 obtains a high resistance against an excessive external force.

Although the rotation deceleration device 31 has the connection boss 46 and the fixing member 53 has the recess portion 56 in this example, the same effects can be obtained in the case when the rotation deceleration device 31 has a recess portion and the fixing member 53 has a connection boss.

Figure 21:
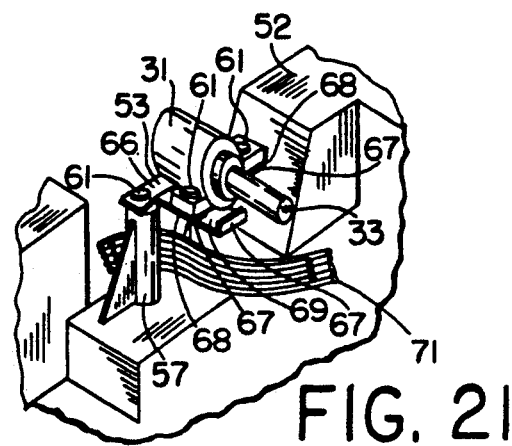
FIG. 21 is a perspective view of a fixing member of the sanitary cleaning device of FIG. 20.
Figure 22:
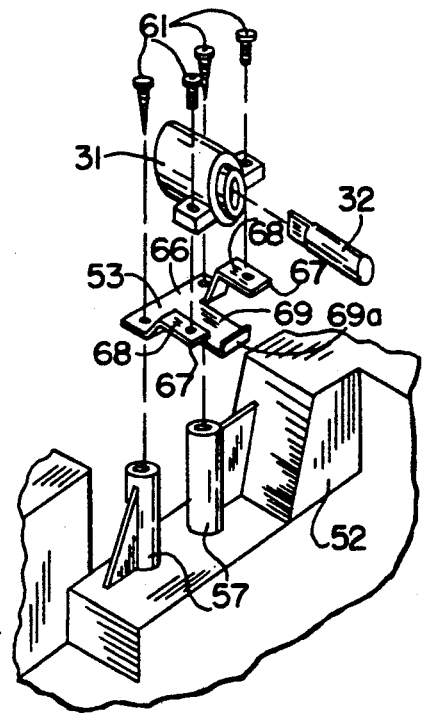
FIG. 22 is an exploded view of the fixing member of FIG. 21.

An example of applying the rotation deceleration device 31 to a toilet seat will be described with reference to FIGS. 20 through 22. The identical members with those of the previous example are indicated by identical reference numerals.

As is shown in FIG. 20, the sanitary cleaning device 50 mounted on a toilet bowl 51 includes a cleaning main body 52 provided on the toilet bowl 51, the rotation deceleration device 31 mounted on the cleaning main body 52 through the fixing member 53, and a toilet seat 65 rotatably connected to the cleaning main body 52 through the rotation shaft 33. As is shown in FIGS. 21 and 22, the fixing member 53 includes a fixing end 66 fixed on two mounting sections 57 each projected from the cleaning main body 52 through pins 61, for mounting the fixing member 53 on the cleaning main body 52. The fixing member 53 further includes two supporting angles 68 cantilevered by the fixed end 66, and a protecting angle 69 provided between the two supporting angles 68. The protecting angle 69 is formed by folding a free end 69a upward. The fixed end 66, the supporting angles 68, and the protecting angle 69 are integrally formed of a stainless steel plate into a substantially E shape. The free end 69a of the protecting angle 69 is disposed below free ends 67 of both of the supporting angles 68. The rotation deceleration device 31 is attached to the free ends 67 of the supporting angles 68 respectively through pins 61, and the fixing member 53 functions as a buffer member. As is shown in FIG. 21, a portion of a lead 71 is inserted between the protecting angle 69 and the cleaning main body 52, and between two mounting sections 57.

In the above construction, the toilet seat 65 is opened when being manually operated. When being lightly pulled from a vertical position to a slightly slanting position, the toilet seat 65 is closed by the weight of the toilet seat 65 while rapid rotation thereof is restricted by the decelerating effect of the rotation deceleration device 31. A stress generated by the rotation moment and the like which are generated when the toilet seat 65 is opened or closed is applied to the rotation deceleration device 31 and the mounting sections 57 of the cleaning main body 52. The stress is partially absorbed by the fixing member 53 acting as a leaf spring, namely, the buffer member. Therefore, the concentration of the stress of the mounting section 57 is avoided. The protecting angle 69 having the free end 69a folded upward protects the lead 71 from damaging due to the warp of the supporting angles 68.

According to the present invention, as mentioned before, the control valve is formed of a material which has a larger coefficient of thermal expansion than that of the material used for the control wall and the cylinder. In consequence, the decelerating effect of the rotation deceleration device is hardly varied in accordance with the temperature.

The fixing member is fixed on the cleaning main body by pressing the top portion and the side portion on the mounting section and pressing the bottom portion on the inner surface of the cleaning main body. In this construction, the stress can be distributed to the whole part of the cleaning main body, thereby avoiding the concentration of the stress on the mounting section. Further, the connection boss which connects the rotation deceleration device and the fixing member has a polygonal shape in which the distances between the rotation center and all the edge lines are substantially identical with one another. Accordingly, the stress is substantially uniformly distributed to the whole part of the cross section of the connection boss, thereby significantly enhancing the strength of the connection boss.

Since one side of the cross section of the connecting boss is different in length from that of the other sides, a desirable mounting angle can accurately be realized.

By using the fixing member provided between the rotation deceleration device and the cleaning main body as a buffer member, the stress applied on the mounting section is partially absorbed, thereby reducing the stress applied on the mounting section.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A sanitary device for use with a toilet bowl, comprising:

a main body casing adopted to be attached to a toilet bowl, the main body casing including a mounting section therein which has a slanting portion projecting upward therefrom;

a fixing member fixed to the mounting section of the main body casing;

a rotation deceleration device including a cylinder fixed to the fixing member and a shaft rotatably mounted in the cylinder, a rotation dampening member operably connected between said cylinder and said shaft whereby the rotation of the shaft is dampened in one direction; and a toilet cover attached to the rotation shaft, wherein the fixing member includes a portion fixed to the mounting section of the main body casing, a side portion integrally formed with the top portion and shaped to mate with the slanting portion of the mounting section, and a bottom portion shaped to mate with a surface of the mounting section from which the mounting section is projected upward.

2. A sanitary cleaning device according to claim 1, wherein the cylinder of the rotation deceleration device includes a connection boss having a polygonal cross section, and the fixing member includes a receiving portion engaged with the connection boss.

3. A sanitary cleaning device according to claim 1, wherein the cylinder of the rotation deceleration device has a polygonal cross section, and the fixing member includes a receiving portion engaged with the cylinder.

* * * * *